United States Patent
Kargl et al.

(10) Patent No.: US 8,533,490 B2
(45) Date of Patent: Sep. 10, 2013

(54) EFFICIENT STORAGE OF CRYPTOGRAPHIC PARAMETERS

(75) Inventors: Anton Kargl, München (DE); Bernd Meyer, München (DE); Achim Schmidt, München (DE); Hermann Seuschek, München (DE)

(73) Assignee: Siemens Aktiengesellschaft, Munich (DE)

( * ) Notice: Subject to any disclaimer, the term of this patent is extended or adjusted under 35 U.S.C. 154(b) by 356 days.

(21) Appl. No.: 13/058,293

(22) PCT Filed: Jul. 21, 2009

(86) PCT No.: PCT/EP2009/059328
§ 371 (c)(1),
(2), (4) Date: Feb. 9, 2011

(87) PCT Pub. No.: WO2010/025992
PCT Pub. Date: Mar. 11, 2010

(65) Prior Publication Data
US 2011/0173456 A1    Jul. 14, 2011

(30) Foreign Application Priority Data
Sep. 8, 2008 (DE) .......................... 10 2008 046 291

(51) Int. Cl.
G06F 21/24 (2006.01)

(52) U.S. Cl.
USPC ................................ 713/189; 380/28; 380/30

(58) Field of Classification Search
USPC ....................... 713/189, 176, 180; 380/28, 30
See application file for complete search history.

(56) References Cited

U.S. PATENT DOCUMENTS

| 6,496,929 | B2 | 12/2002 | Lenstra | 713/161 |
| 6,618,483 | B1 * | 9/2003 | Vanstone et al. | 380/30 |
| 6,956,946 | B1 | 10/2005 | Hess et al. | 380/30 |
| 7,236,589 | B2 | 6/2007 | Lauter et al. | 380/28 |
| 2007/0211893 | A1 * | 9/2007 | Frosik et al. | 380/30 |
| 2009/0136025 | A1 | 5/2009 | Kargl et al. | 380/30 |
| 2011/0173456 | A1 | 7/2011 | Kargl et al. | 713/189 |

FOREIGN PATENT DOCUMENTS

| CN | 101253473 A | 8/2008 |
| FR | 2852470 A1 | 9/2004 |
| JP | 2002504720 A | 2/2002 |
| JP | 2002510810 A | 4/2002 |
| WO | 99/43124 | 8/1999 |
| WO | 2008/104482 A2 | 9/2008 |
| WO | 2010/025992 A1 | 3/2010 |

OTHER PUBLICATIONS

International PCT Search Report, PCT/EP2009/059328, 20 pages, Oct. 30, 2009.
Lopez, J., et al., "New Point Compression Algorithms for Binary Curves", Information Theory Workshop, 2006 IEEE Punta Del Este, Uruguay, pp. 126-130.
Eagle, P., et al., "Point Compression for Koblitz Elliptic Curves", Cryptology Eprint Archive: Report 21009/086, online http://eprint.jacr.org/2009/086.pdf, 6 pages.

* cited by examiner

*Primary Examiner* — Kambiz Zand
*Assistant Examiner* — Noura Zoubair
(74) *Attorney, Agent, or Firm* — King & Spalding L.L.P.

(57) ABSTRACT

Cryptographic products for mass applications, such as RFIDs or special ICs for the protection from plagiarism, always require that the price per unit costs are reduced as low as possible. This is achieved, for example, in that in such methods the required storage space is further reduced for system parameters to be permanently stored. Accordingly, in a method for coding and decoding the cryptographic system parameters of an elliptical curve, when storing the system parameters, storage cells are each completely occupied, and therefore no storage space is wasted.

20 Claims, 2 Drawing Sheets

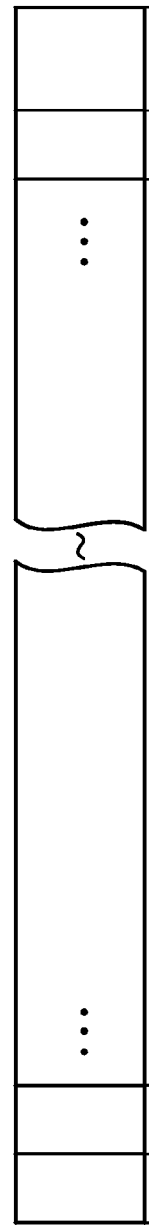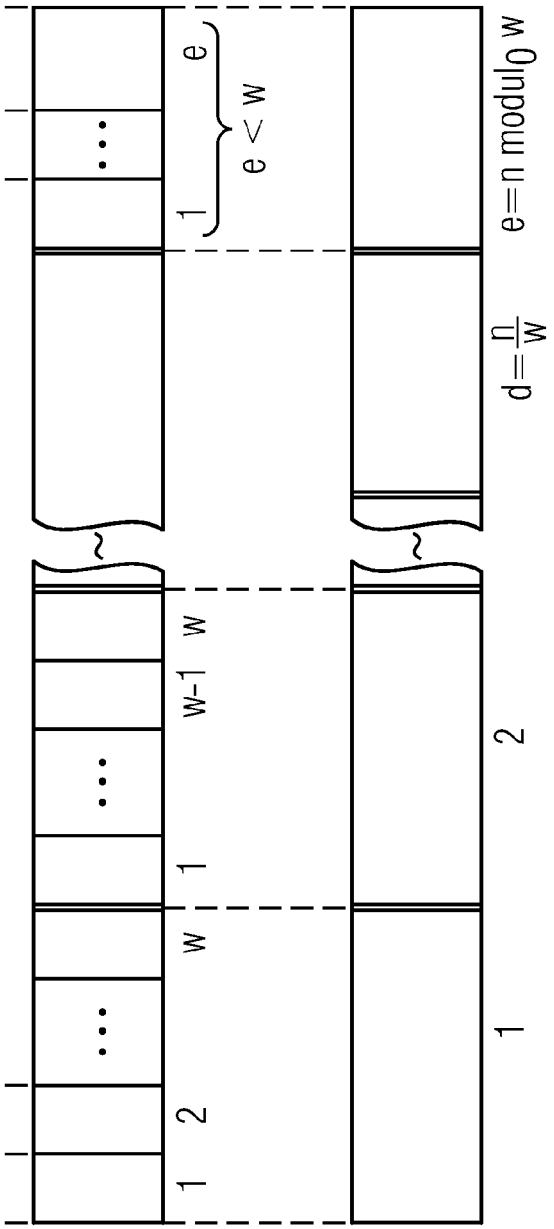
FIG 1A
FIG 1B
FIG 1C

EFFICIENT STORAGE OF CRYPTOGRAPHIC PARAMETERS

CROSS-REFERENCE TO RELATED APPLICATIONS

This application is a U.S. National Stage Application of International Application No. PCT/EP2009/059328 filed Jul. 21, 2009, which designates the United States of America, and claims priority to DE Application No. 10 2008 046 291.8 filed Sep. 8, 2008. The contents of which are hereby incorporated by reference in their entirety.

TECHNICAL FIELD

The invention relates to a method and a device for computer-aided determination of an elliptic curve for cryptographic applications, so as to facilitate efficient storage of cryptographic parameters. It also relates to a method for reconstruction of an elliptic curve determined by such a method and to a method for computer-aided multiplication of a point by a scalar based on an elliptic curve determined or reconstructed in this way.

BACKGROUND

Cryptographic applications based on elliptic curves over finite fields currently represent the most efficient asymmetric cryptography method. This is because, with elliptic curves, by contrast with the first-generation asymmetric cryptography method, there are no known methods of attack with a subexponential running time. Consequently the security gain per bit of the security parameter used is greater, so that significantly shorter key lengths can be used for practical applications. The resulting methods perform better and need a smaller bandwidth for transmission of the system parameters than other asymmetric cryptography methods with comparable security.

To operate such methods different data must be stored. These include on the one hand the key material which is assigned to each user of the system individually, and also the general system parameters. These system parameters are publicly known and all users of the cryptographic methods employ the same system parameters. Parts of the system parameters are implicitly known to all users through the cryptographic methods used or through their implementation, other values must be permanently stored by each user, for example in a non-volatile memory (PROM, EEPROM, flash, other data media etc.).

With cryptographic methods based on the point group of an elliptic curve over a finite field these general system parameters at least consist of data for definition of the finite field used (prime number, prime number power and/or irreducible polynomial) and the curve parameters for defining the elliptic curve used. If necessary there is also further data for definition of the coordinates of a base point or the power of the point group and/or a subgroup.

With low-cost cryptographic products for mass application, such as RFIDs or special ICs for protecting against plagiarism for example, there is already the requirement to reduce the unit price costs as far as possible. The manufacturing costs of such semiconductor products are primarily governed by the chip surface needed which in its turn depends on the capacity required for non-volatile memory. To this extent a need exists to further reduce the required storage capacity for system parameters to be stored permanently in such methods.

SUMMARY

According to various embodiment, an asymmetric cryptography method can be specified with which the required storage space for system parameters of the asymmetric cryptography method to be stored permanently is reduced.

According to an embodiment, in a method for computer-aided determination of an elliptic curve for cryptographic applications, the system parameters of the elliptic curve are determined, wherein a memory cell for storing information of the system parameters has a prespecifiable bit length w, the system parameters are each able to be represented as a bit sequence with the bit length n, so that a system parameter for storage in $d=n/w$ memory cells has a remainder bit sequence $e=n$ modulo $w=n-d*w$ in each case, wherein the system parameters of the elliptic curve are determined such that the remainder bit sequence has a prespecifiable constant pattern.

According to a further embodiment, the bit sequence determined can be stored for the system parameters with the bit length $n-e$ in the d memory cells. According to a further embodiment, a check can be made as to whether a predetermined cryptographic quality criterion is fulfilled for the elliptic curve determined, and part of the predetermined cryptographic quality criterion including the remainder bit sequence e having a prespecifiable constant pattern, in which the elliptic curve determined is selected as an elliptic curve when the cryptographic quality criterion is fulfilled. According to a further embodiment, the curve parameters can be determined by a birational transformation of an elliptic curve equation. According to a further embodiment, the system parameters can be determined by transformation of an irreducible polynomial of an underlying field over which the elliptic curve is defined. According to a further embodiment, the bit length w of the memory cells may correspond to a power of two. According to a further embodiment, a cryptographic method can be carried out using the elliptic curve determined.

According to another embodiment, in a method for reconstruction of an elliptic curve determined by a method as described above, the bit sequence stored in each case in the d memory cells of bit length $n-e=d*w$ is read out, the respective system parameter is reconstructed by supplementing the predetermined remainder bit length e with the respecifiable constant pattern.

According to yet another embodiment, in a method for computer-aided multiplication of a point by a scalar, the elliptic curve can be determined by a method as described above, the point lies on the elliptic curve determined, and the multiplication is undertaken using only one local coordinate of the point on the elliptic curve determined.

According to a further embodiment of the above method, the multiplication can be undertaken using only one x-coordinate of the point on the elliptic curve. According to a further embodiment of the above method, the multiplication can be undertaken by a number of additions and doublings of the point lying on the elliptic curve with itself corresponding to the scalar.

According to yet another embodiment, a device for determining an elliptic curve with a processor unit can be configured for carrying out the steps of the method as described above.

BRIEF DESCRIPTION OF THE DRAWINGS

The invention will now be explained in greater detail with exemplary embodiments which refer to the figures. The figures show:

FIG. 1a, 1b, 1c a schematic representation of a bit sequence of a system parameter with a division into d memory cells and a remainder bit sequence e in accordance with various embodiments, FIG. 2a, 2b, 2c a schematic representation of a constant pattern of a remainder bit sequence in accordance with various embodiments.

DETAILED DESCRIPTION

In the method according to various embodiments for computer-aided determination of an elliptic curve for cryptographic applications system parameters of the elliptic curve (E) are determined. A memory cell for storing system parameter information in this case has a prespecifiable bit length w. The system parameters are able to be represented each case by a bit length n, so that a system parameter for storage in $d=n/w$ memory cells in each case has a remainder bit sequence $e=n$ modulo $w=n-d*w$.

The system parameters of the elliptic curve (E) are now determined such that the remainder bit sequence e has a prespecifiable constant pattern.

In the method according to various embodiments for reconstruction of an elliptic curve (E) determined as described above, the bit sequence of bit length $n-e=d*w$ stored in the d memory cells is read out in each case. The respective system parameter is reconstructed by supplementing the predetermined remainder bit length e with the prespecifiable constant pattern.

In the method for computer-aided multiplication of a point by a scalar according to various embodiments, an elliptic curve (E) is determined or reconstructed respectively as above.

The point lies in this case on the elliptic curve determined. The multiplication is then undertaken using only one local coordinate of the point on the elliptic curve (E) determined.

The device according to various embodiments for determining an elliptic curve has a processing unit which is configured for executing the method steps shown above.

An Abelian group structure G can be defined on the set of the points of elliptic curve. This group structure induces a scalar multiplication $ZxG \cdot G$ of integers with curve points which forms the basis of all cryptographic methods based on elliptic curves. Let s be an integer, P a point of the elliptic curve E and $Q=sP$ the s-multiple of point P. If the points P and Q are given, the calculation of a suitable scalar is referred to by $Q=sP$ as the discrete logarithm problem for elliptic curves. With a suitable choice of the field K and the parameter of the elliptic curve E it is impossible with algorithmic means currently available to solve the discrete logarithm problem within an acceptable time. The security with cryptographic applications of elliptic curves is based on this difficulty. An elliptic curve E is thus generally described by a cubic equation in the form $y^2+a_1xy+a_3y=x^3+a_2x^2+a_4x+a_6$, with $a_1, a_2, a_3, a_4, a_6$ being elements of a finite field K which parameterize the curve E and are consequently referred to as system parameters. The set of all pairs (x, y) of $K^2$ which fulfill the given curve equation E are called the points of the elliptic curve E.

With the aid of the discrete logarithm problem asymmetric cryptography methods for encryption, for creation of electronic signatures and for other applications can now be formed. For this purpose a user of the asymmetric cryptography method selects a point P of an elliptic curve E, the so-called base point and a scalar s. The scalar s forms the secret key and the point $Q=sP$ forms the public key of the asymmetric cryptography method.

For cryptographic applications a finite field K is used. This means that the Abelian group G also forms a finite group. Consequently the number of points which fulfill the curve equation E is finite. So that an elliptic curve E ($a_1, a_2, a_3, a_4, a_6$) is suitable for cryptographic applications, the parameters $a_1, a_2, a_3, a_4, a_6$ must be suitably selected from K. The curve E and the point group G resulting from the parameters must meet specific characteristics which are described in technical literature.

These can be taken for example from the catalog of requirements of the Federal Office for Information Security in which suitable cryptographic methods the signature applications in accordance with the German signature law are specified.

The security of a cryptographic method based on elliptic curves thus essentially depends on the cryptographic properties of the selected elliptic curve.

In the following we will now consider elliptic curves over a finite field $GF(2^n)$ of characteristic 2. For such a finite field the elements are typically represented as bit strings of length n. The individual bits in such cases represent the coefficients of the element in relation to a polynomial base or a normal base. This representation is very compact and memory-efficient.

For reasons of cryptographic security of the elliptic curves used the degree of expansion n of the finite field $GF(2^n)$ which defines the length of the bit strings for representation of the field elements cannot be a composite number. In particular powers of two as the degree of expansion are forbidden for practically-relevant implementations. On the other hand all normal memory systems—volatile and non-volatile memory—use a sequence of bits as the smallest data unit able to be stored, with the number of bits being adapted to the bus widths of the associated computer systems. Typically powers of two occur as bus widths (example 8 bits, 16 bits, 32 bits, 64 bits, etc.). Therefore in the storage of system parameters of a cryptographically-strong elliptic curve over a finite field $GF(2^n)$ of characteristic 2 not all memory cells used can be exploited in the optimum way. Memory cells which are only partly occupied by information about the system parameters always occur. This problem also occurs when the variables of the memory units used are not powers of two. The degree of expansion n of the finite field must be prime and does not thus possess any non-trivial divisors.

If standard components are now used for implementing the volatile and non-volatile memory, these chips are traditionally based on data variables which are adapted to the bus widths of computer systems. In the storage of system parameters for example, parts of the memory realized in this way have no function and the chip surface needed for this additional memory is wasted. If conversely the memory is adapted to the exact length of the parameters to be stored, special developments of memory are frequently required and available standard components cannot be employed. In addition with many implementations the chip surface needed to realize the wide buses increases greatly.

This problem especially occurs with non-volatile memories based on EEPROM or Flash technology. For technical reasons the individual bits of such a memory cannot be read or written directly.

Instead the entire memory is divided up into smaller banks and it is only ever possible to access all bits of one bank simultaneously. The width of these banks is usually likewise a power of two.

According to various embodiments, in the method for encoding and decoding cryptographic parameters of an elliptic curve over a finite field of characteristic 2, the memory space needed to store the parameters does not have any partly occupied memory cells.

Let there be a finite field GF($2^n$) with prime degree of expansion n as well as the width w of the memory cells (of the volatile or non-volatile) memory. Let d be an integer component of the division of n by w and let e be the remainder of the division.

This situation is shown once again in FIG. 1 a, b, c. FIG. 1a shows a bit sequence of a system parameter with n bit elements. With a width w of a memory cell the individual memory cells are then only able to be completely occupied by the bit sequence in each case if the division d=n/w is able to be undertaken without a remainder.

FIGS. 1b and 1c show the occupation of the memory cells with the bit sequence of the system parameter. In this case d=n/w memory cells are completely occupied while one memory cell is only occupied by e=n modulo w bit elements.

Consequently, in order to store an element a of the field GF($2^n$) in the memory. At least d+1 memory cells are needed. Of these memory cells d memory cells are completely occupied by information. The remaining memory cell merely contains e bits of information and is thus only partly occupied.

The various embodiments now create a method for encoding and decoding the cryptographic system parameters of an elliptic curve so that the parameters to be stored which are elements of the finite field GF($2^n$) are able to be stored in d memory cells. This means that, to store such an element, instead of n bits only d*w=n−e bits are needed.

To obtain a representation of the parameter in n−e bits, e bits of the representation of an element of the finite field GF($2^n$) are set to a constant value. This constant is implicitly known and therefore does not have to be stored. The algorithm for implementing the cryptographic method, for reconstruction of the system parameter, reads out the d*w bits stored in the d memory cells and now implicitly sets the remaining e bits to their constant values.

Figures 2A, 2B, 2C:
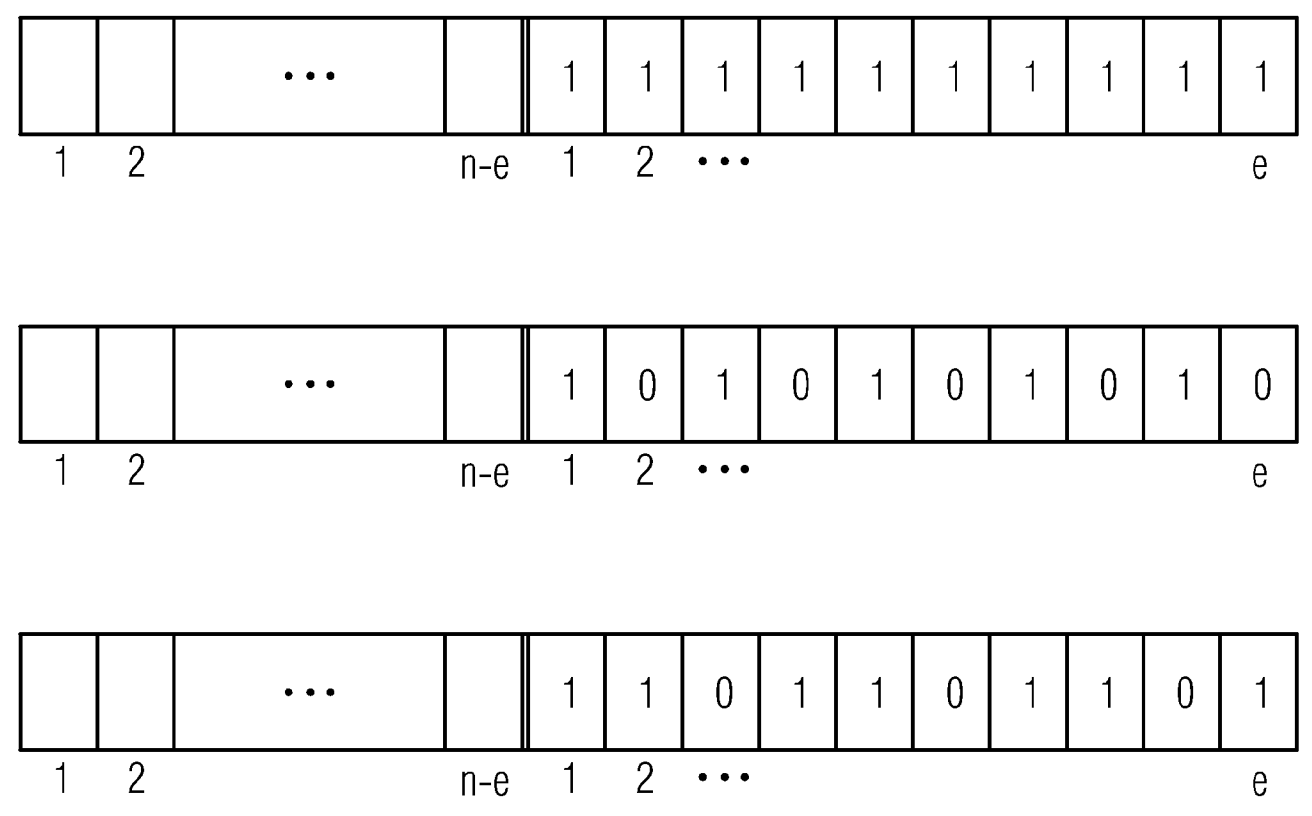

FIGS. 2a, 2b and 2c each show examples for a constant pattern of the remainder bit sequence with e bit elements. The first n−e bit elements in each case in the bit sequences from FIG. 2a, b, c specify the values of the corresponding system parameter at these points. The following e bit elements in each case show the constant bit pattern. Thus FIG. 2a has a bit pattern of (1,1,1,1, . . . ), FIG. 2b the bit pattern (1,0,1,0, 1, . . . ) and FIG. 2c the bit pattern (1,1,0,1,1,0, . . . ). These bit patterns are of course only examples of forms of embodiment. The use of further suitable constant bit patterns such as (0,0, 0,0,0, . . . ) for example is at the discretion of the person skilled in the art.

In this way the selection and number of the system parameters available is actually restricted, because the e bits do not have the prespecified constant value for all possible system parameters. If the number e of the constant bits is not too large, it is however relatively simple in practice to find a cryptographically-strong elliptic curve over the finite field GF($2^n$) so that the criterion for these e bits is fulfilled. This means that the values of the e bits correspond to the prespecified constants.

Thus system parameters of elliptic curves over a finite field GF($2^n$) of characteristic 2 with a prime degree of expansion n are stored with optimum utilization of a memory with a bus width w, by e bits of the system parameters being set to a constant value and thus being known implicitly and not having to be stored according to various embodiments. In this case e is the remainder in the division of n by w.

Cryptographic systems based on elliptic curves which possess such compactly represented parameters system, with suitable determination of the system parameters, achieve the same level of security that normally-represented elliptic curves have.

In particular, in the described encoding of the system parameters, it is possible to reconstruct the complete element of the finite field in an efficient manner.

A method for finding suitable system parameters of a strong elliptic curve with the compact representation described above in d memory cells consists of taking into account in the search for system parameters that the selected e bits of the representation of the system parameters possess a prespecified constant pattern.

In another variant an elliptic curve already available can, through a birational transformation of the curve equation or by transformation of the irreducible polynomial defining the underlying finite field, be put into the form such that the selected e bits of the representation of the system parameters possess a prespecified constant pattern.

Examples for prime degrees of expansion n, which are suitable for the described method, are 131, 163 and 257. If the used width of the memory amounts to one of the widely-used values of 8 bits, 16 bits or 32 bits, with these degrees of expansion only 3, 3 or 1 bit must be set to a constant value, typically 0.

What is claimed is:

1. A method for computer-aided determination of an elliptic curve for cryptographic applications, the method comprising:
   determining the system parameters of the elliptic curve, wherein a memory cell for storing information of the system parameters has a prespecifiable bit length w, the system parameters are each able to be represented as a bit sequence with the bit length n, so that a system parameter for storage in d=n/w memory cells has a remainder bit sequence e=n modulo w=n−d*w in each case,
   wherein
   the system parameters of the elliptic curve are determined such that the remainder bit sequence has a prespecifiable constant pattern.

2. The method according to claim 1, wherein
   the bit sequence determined being stored for the system parameters with the bit length n−e in the d memory cells.

3. The method according to claim 1, wherein
   a check being made as to whether a predetermined cryptographic quality criterion is fulfilled for the elliptic curve determined,
   and part of the predetermined cryptographic quality criterion including the remainder bit sequence e having a prespecifiable constant pattern,
   in which the elliptic curve determined is selected as an elliptic curve when the cryptographic quality criterion is fulfilled.

4. The method according to claim 1, wherein
   the curve parameters being determined by a birational transformation of an elliptic curve equation.

5. The method according to claim 1, wherein
   the system parameters being determined by transformation of an irreducible polynomial of an underlying field over which the elliptic curve is defined.

6. The method according to claim 1, wherein the bit length w of the memory cells corresponding to a power of two.

7. The method according to claim 1, wherein
   a cryptographic method is carried out using the elliptic curve determined.

8. The method for reconstruction of an elliptic curve (E) determined by a method according to claim 1,
   wherein the bit sequence stored in each case in the d memory cells of bit length n−e=d*w is read out,
   the respective system parameter is reconstructed by supplementing the predetermined remainder bit length e with the prespecifiable constant pattern.

9. A method for computer-aided multiplication of a point by a scalar,
   in which the elliptic curve is determined by a method according to claim 8,
   the point lies on the elliptic curve determined,
   the multiplication is undertaken using only one local coordinate of the point on the elliptic curve determined.

10. The method according to claim 9,
    wherein the multiplication is undertaken using only one x-coordinate of the point on the elliptic curve.

11. The method according to claim 9, wherein
    the multiplication is undertaken by a number of additions and doublings of the point lying on the elliptic curve with itself corresponding to the scalar.

12. A device for determining an elliptic curve comprising a processor unit which is configured for determining the system parameters of the elliptic curve, wherein a memory cell for storing information of the system parameters has a prespecifiable bit length w, the system parameters are each able to be represented as a bit sequence with the bit length n, so that a system parameter for storage in d=n/w memory cells has a remainder bit sequence e=n modulo w=n−d*w in each case, wherein the system parameters of the elliptic curve are determined such that the remainder bit sequence has a prespecifiable constant pattern.

13. The device according to claim 12, wherein
    the bit sequence determined being stored for the system parameters with the bit length n−e in the d memory cells.

14. The device according to claim 12, wherein
    the processor is further configured to perform a check as to whether a predetermined cryptographic quality criterion is fulfilled for the elliptic curve determined, and part of the predetermined cryptographic quality criterion including the remainder bit sequence e having a prespecifiable constant pattern, in which the elliptic curve determined is selected as an elliptic curve when the cryptographic quality criterion is fulfilled.

15. The device according to claim 12, wherein the curve parameters being determined by a birational transformation of an elliptic curve equation.

16. The device according to claim 12, wherein
    the system parameters being determined by transformation of an irreducible polynomial of an underlying field over which the elliptic curve is defined.

17. The device according to claim 12, wherein the bit length w of the memory cells corresponding to a power of two.

18. The device according to claim 12, wherein a cryptographic method is carried out using the elliptic curve determined.

19. The method according to claim 8, wherein
    the bit sequence determined being stored for the system parameters with the bit length n−e in the d memory cells.

20. The method according to claim 8, wherein
    a check being made as to whether a predetermined cryptographic quality criterion is fulfilled for the elliptic curve determined, and part of the predetermined cryptographic quality criterion including the remainder bit sequence e having a prespecifiable constant pattern, in which the elliptic curve determined is selected as an elliptic curve when the cryptographic quality criterion is fulfilled.

* * * * *